May 25, 1948. C. L. BUNTEN 2,442,071
DEVICE FOR TRANSPORTING AND LAUNCHING BOATS
Filed June 15, 1946 2 Sheets-Sheet 1
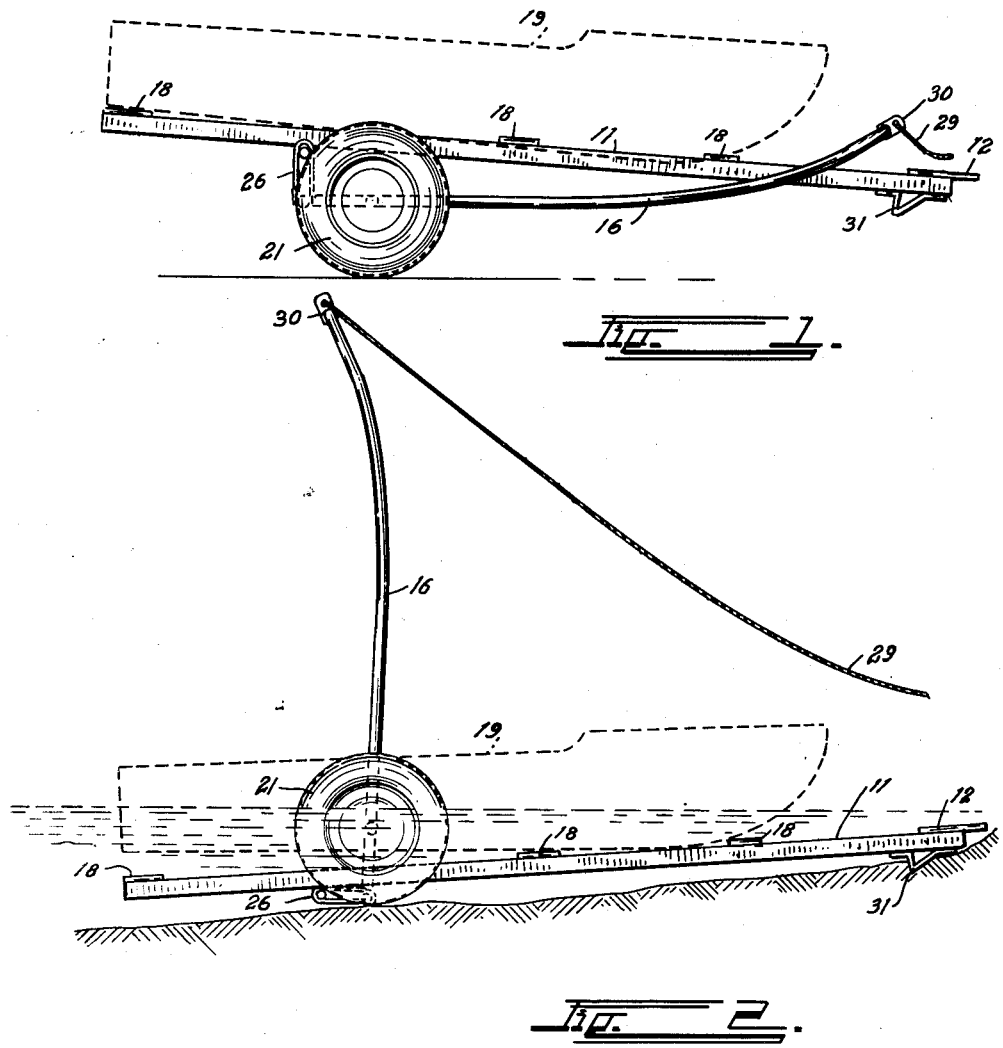
INVENTOR.
CLAUDE L. BUNTEN.
BY
ATTORNEY.

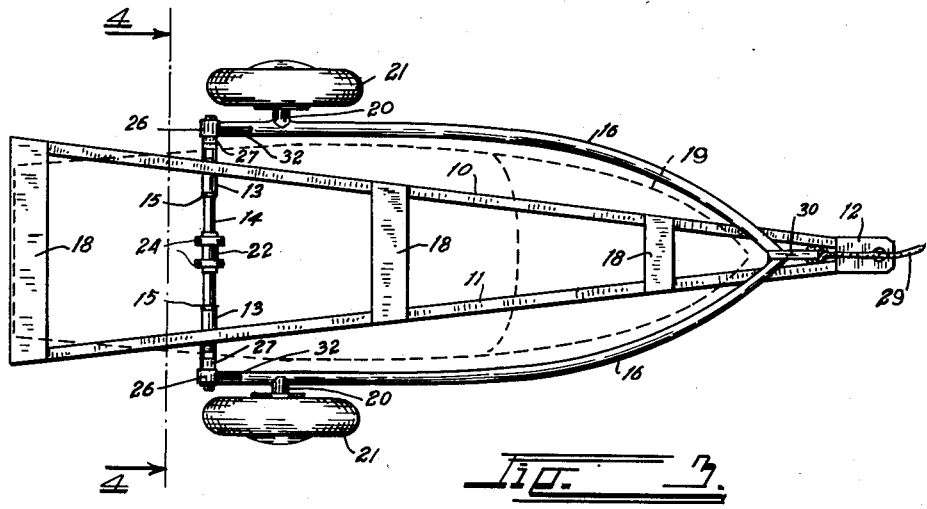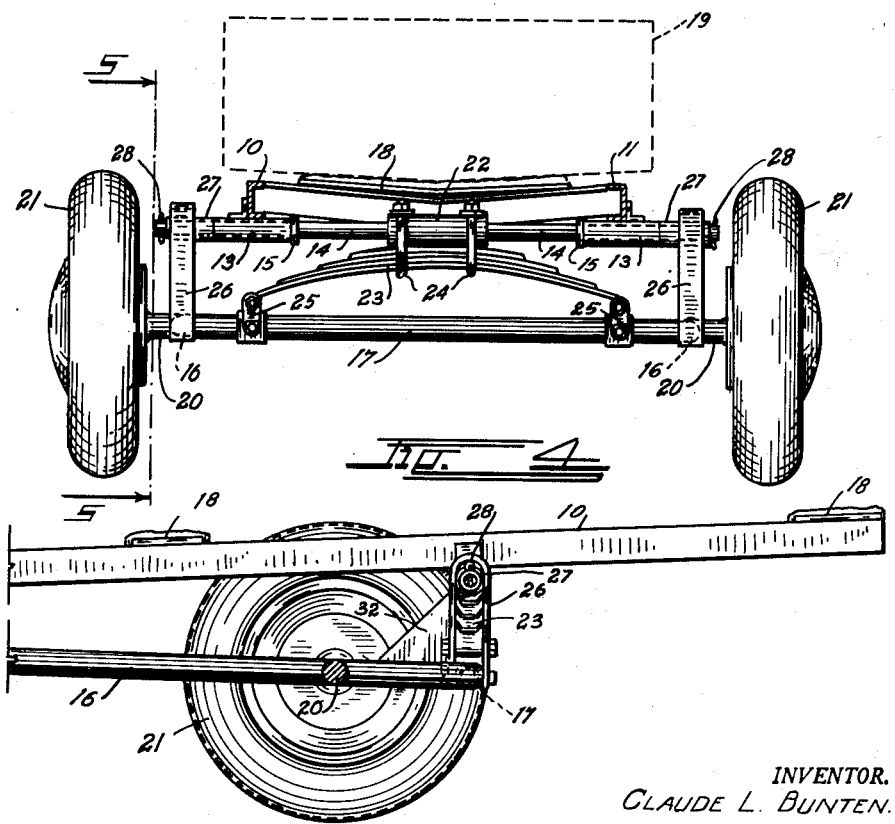

Patented May 25, 1948

2,442,071

UNITED STATES PATENT OFFICE 2,442,071

DEVICE FOR TRANSPORTING AND LAUNCHING BOATS

Claude L. Bunten, Rawlins, Wyo.

Application June 15, 1946, Serial No. 676,971

2 Claims. (Cl. 280—33.4)

This invention relates to a boat trailer; that is, a vehicle adapted to be towed behind a motor vehicle for transporting a boat, and has for its principal object the provision of a simple, lightweight, and highly efficient trailer for towing a boat behind a motor vehicle, which will also serve to lift the boat from the water or lower it into the water.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved boat trailer in the towing position;

Fig. 2 is a side view of the trailer in position to lift a boat from the water;

Fig. 3 is a plan view of the trailer in the towing position;

Fig. 4 is an enlarged cross-section, taken on the line 4—4, Fig. 3; and

Fig. 5 is a detail section, taken on the line 5—5, Fig. 4.

The improved boat trailer employs an A-shaped boat supporting frame formed from two tubular side members 10 and 11. The side members 10 and 11 are separated at their rearward extremities and are brought together at their forward extremities and secured to a suitable tow plate 12, or other suitable fitting. Hinge sleeves 13 are fixedly secured beneath the side members 10 and 11 at the selected balance point thereof. A hinge member 14 extends rotatably through the sleeves. The latter are maintained in the proper separated position thereon by means of set collars 15 secured to the hinge member 14.

Padded boat cradle members 18 extend across the A-shaped frame at suitable intervals for supporting a boat thereon, as indicated in broken lines at 19. The forward extremity of the A-shaped frame may be provided with a suitable skid 31 to support the frame when detached from the towing vehicle.

The improved boat trailer also employs a boat-shaped lever frame 16 of a contour and size to fit over and around the boat which it is designed to carry. The rearward extremity of the lever frame 16 is closed by means of a cross member 17 extending transversally beneath the A-shaped frame. The forward extremity terminates in a rope attachment plate 30. Axle studs 20 are welded or otherwise formed on the sides of the lever frame 16 in spaced relation to the cross member 17. Suitable ground-engaging wheels 21 are mounted on the axle studs 20.

A spring sleeve 22 is welded or otherwise secured about the middle of the hinge member 14. The mid-portion of a leaf spring 23 is clamped to the spring sleeve by means of suitable U-bolts 24. The extremities of the leaf spring terminate in swinging spring shackles 25 which are pivotally mounted in any desired manner on the cross member 17. The spring 23 serves to cushion the weight of the A-shaped frame and boat on the cross member 17.

Inverted, U-shaped guides 26 are fixed to the cross member 17 and extend upwardly about the extremities of the hinge member 14 to maintain the latter in proper radial relation to the cross member 17. Rotatable bushing sleeves 27 are mounted on the extremities of the hinge member 14 within the guides 26 to prevent wearing friction at this point. The guides are preferably braced from the A-shaped frame by means of suitable gusset brace plates 32. The sleeves 27 may be held in place by suitable cotter keys 28, or in any other desired manner. A pull rope 29 is secured to the rope attachment plate 30.

It will be noted from the above description that, when the lever frame 16 is raised to the vertical position of Fig. 2, the A-shaped frame will be lowered to the ground, and that when the rope 29 is drawn upon, it will pull the lever frame forwardly, causing it to pry or lift the rear extremity of the A-shaped frame to the towing position of Fig. 1.

In use, the trailer is backed into the water of a lake or stream. The rope 29 is released, allowing gravity to lower the A-shaped frame beneath the boat so that the latter will rest upon the water, as shown in Fig. 2. To pick up the boat, it is only necessary to back the wheels into the water, guide the boat over the submerged A-shaped frame, and thence pull upon the rope 29 to lift the boat from the water.

While a specific form of the improvement has been described and illustrated herein, it is desired to be understood that the same may be varied, within the scope of the appended claims, without departing from the spirit of the invention.

Having thus described the invention, what is claimed and desired to be secured by Letters Patent is:

1. A boat trailer comprising: a relatively flat lever frame; a ground engaging wheel mounted at each side of said lever frame, said wheels being positioned adjacent the rear extremity of said lever frame to act as fulcrums therefor, so that when the front of said lever frame is swung forwardly and downwardly the rear extremity will swing rearwardly and upwardly; a cross member forming the rear extremity of said lever frame; a leaf spring mounted on and above said cross member and extending transversally of said lever frame; means for maintaining said spring in a plane at right angles to the plane of said lever frame; a boat supporting frame overlying said lever frame; and means hinging said boat frame to said spring so that the movements of the rear extremity of said hinged frame will be communicated to said boat supporting frame through said spring.

2. A boat trailer comprising: a relatively flat lever frame; a ground engaging wheel mounted at each side of said lever frame, said wheels being positioned adjacent the rear extremity of said lever frame to act as fulcrums therefor, so that when the front of said lever frame is swung forwardly and downwardly the rear extremity will swing rearwardly and upwardly; a cross member forming the rear extremity of said lever frame; a leaf spring mounted on and above said cross member and extending transversally of said lever frame; a boat supporting frame; overlying said lever frame; hinge sleeves secured to and extending transversally of and below said boat supporting frame adjacent the rear thereof; a hinge shaft rotatably mounted in said sleeves; means securing said hinge shaft to said spring; and means for maintaining said hinge shaft in a plane substantially at right angles to the plane of said lever frame so that the movements of the rear extremity of said lever frame will be communicated to said boat supporting frame.

CLAUDE L. BUNTEN.

REFERENCES CITED

The following references are of record in the file of this patent:

UNITED STATES PATENTS

| Number | Name | Date |
|---|---|---|
| 719,059 | Tabor | Jan. 27, 1903 |
| 1,956,245 | Moorman et al. | Apr. 24, 1934 |
| 2,179,477 | Berendsen | Nov. 14, 1939 |
| 2,227,762 | Ronning | Jan. 7, 1941 |
| 2,415,771 | Van Agtmael | Feb. 11, 1947 |